United States Patent

[11] 3,612,106

[72] Inventors Andre Alphonse Mederic Leon Camboulives
Billancourt;
Jean-Claude Lucien Delonge, Moissy-Cramayel; Roger Alfred Jules Vandenbroucke, Antony, all of France
[21] Appl. No. 51,894
[22] Filed July 2, 1970
[45] Patented Oct. 12, 1971
[73] Assignee Societe Nationale D'Etude Et De Construction De Moteurs D'Aviation Paris, France
[32] Priority July 3, 1969
[33] France
[31] 6922624

[54] ARRANGEMENT FOR CONTROLLING AND SUPPORTING A VARIABLE-GEOMETRY DUCT
9 Claims, 6 Drawing Figs.
[52] U.S. Cl. .................................................. 138/45, 239/265.33, 239/265.39
[51] Int. Cl. .................................................. F15d 1/08, B64c 15/04, B64c 15/06

[50] Field of Search .......................................... 138/45, 46; 60/271; 239/265.33, 265.35, 265.37, 265.39

[56] References Cited
UNITED STATES PATENTS
| | | | |
|---|---|---|---|
| 2,779,157 | 1/1957 | Palmer | 239/265.37 |
| 2,939,274 | 6/1960 | Olson | 138/45 X |
| 2,972,226 | 2/1961 | Geary | 239/265.39 |
| 3,537,647 | 11/1970 | Cambaulines et al. | 239/265.33 X |

Primary Examiner—Herbert F. Ross
Attorney—William J. Daniel

ABSTRACT: An arrangement for controlling and supporting within a fairing a duct whose section is controllable by means of flaps, said arrangement comprising a transverse body extending within the space defined between said duct and the fairing and being connected to the fairing through the medium of articulated arms, each of the flaps being suspended from said body through the medium of two independent, adjustable linkages respectively articulated to two zones of the flap which are axially spaced from one another.

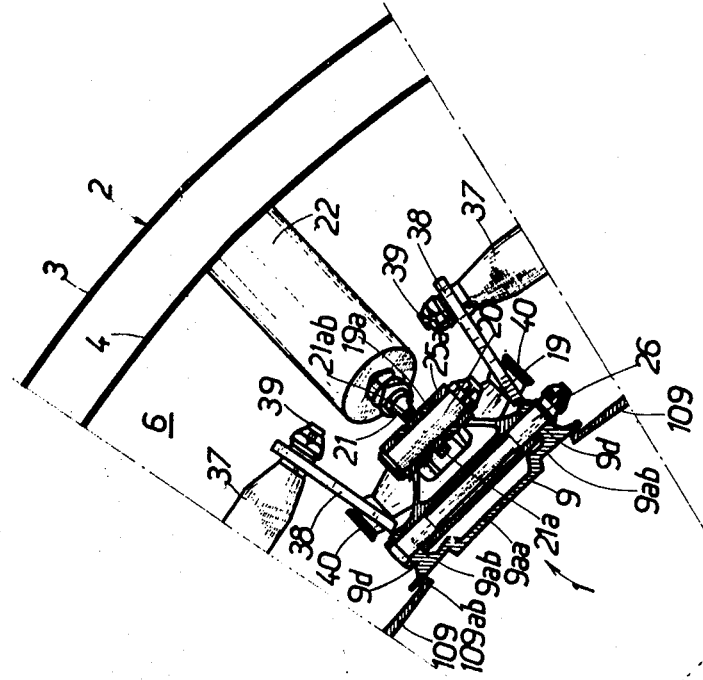
FIG.:4
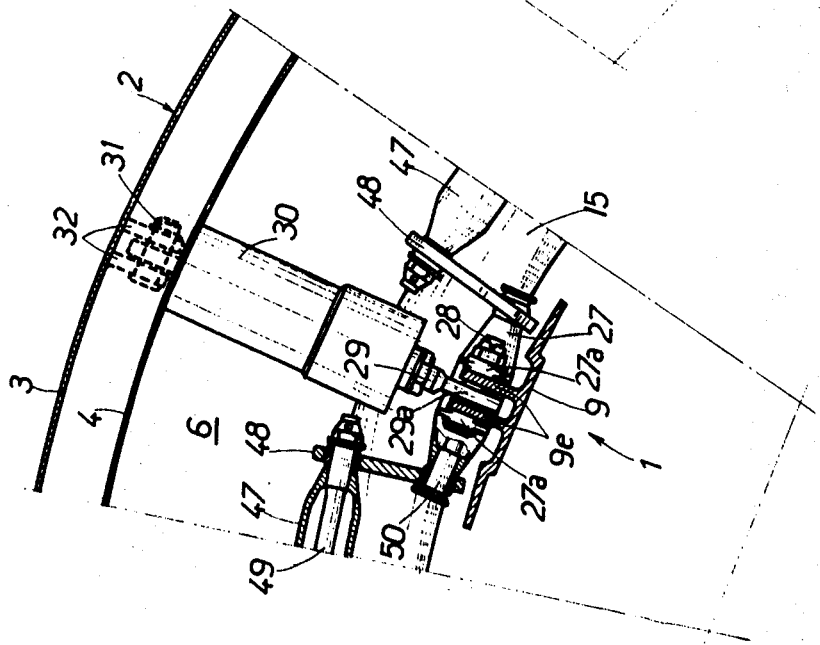
FIG.:5

ARRANGEMENT FOR CONTROLLING AND SUPPORTING A VARIABLE-GEOMETRY DUCT

This invention relates to an arrangement for controlling and supporting a variable-geometry duct assembled inside a fairing, said duct comprising a peripheral series of adjustable main flaps, arranged around the axis of the duct, certain of said flaps, at least, being controlled flaps. The invention relates more particularly, but not exclusively, to jet propulsion power plants, in particular gas turbine jet engines, in which the variable-geometry duct constitutes either an air-intake or, more usually, a nozzle or flame tube for a gas jet, which nozzle or tube is designed to operate equally well in subsonic and in supersonic conditions.

The invention offers a variety of advantages, not least amongst which is the fact that it is possible through simple and robust means, the combined application of which will be apparent to a person skilled in the art, to produce a nozzle which is capable of constant adaptation (with an accuracy and efficiency which are superior to those hitherto attainable with the known systems), to the various conditions of loading on the jet engine equipped with such a nozzle, this also throughout a large range of speeds and altitudes of flight on the part of a vehicle, such as an aircraft, propelled by said jet engine. Other advantages of the invention will be apparent from the ensuing text.

The arrangement of control and support in accordance with the invention comprises a transverse supporting body extending within the space defined between the duct and the fairing and connected to the fairing through a peripheral series of arms articulated at their respective ends to said fairing and to said body, each of the controlled flaps being suspended from said body in an articulated manner through the medium of two independent linkages respectively articulated to the one and the other of two flap zones which are axially spaced from one another, each of said linkages comprising a control lever one of whose ends is articulated to said body and whose other end is articulated to an individual control element associated with the said zone of the flap.

Preferably, each of the two control elements for a flap will be constituted by the moving part of a jack the fixed part of which is articulated to the fairing. Preferably, also, each of the flaps will, when viewed in a section taken through an axial plane, exhibit a curved profile so that the duct or nozzle, in certain flap positions, exhibits a convergent-divergent configuration.

It appears, although this was by no means obvious originally, that the design of control linkages in accordance with the invention lent itself particularly well to their integration into a closed synchronizing system designed, more particularly, to maintain the throat and exit sections of the nozzles circular and concentric with one another, this in particular in the event of any asymmetry in the operation of the jacks used to control the flaps.

To this end, in accordance with a preferred embodiment of the invention, a synchronizing system of this kind comprises, in respect of one of the zones of the flap, a series of intermediate levers respectively located between the peripherally consecutive control levers associated with said zone, said intermediate levers being connected in each case through the medium of two articulated synchronizing links, to the two control levers surrounding it, and being themselves articulated to the transverse supporting body.

Possible asymmetries in the control of the flaps can thus no longer give rise to ovalizing in or eccentricity of the nozzle, but is instead absorbed in the form of mechanical stresses, by the transverse supporting body.

In accordance with another feature of the invention, the transverse supporting body is connected to the fairing by means of a peripheral series of arms articulated at their respective ends to the fairing and to said body. In the case where a fixed-geometry duct is itself centered in the fairing through the medium of a peripheral series of spacers articulated at their two ends respectively to the fairing and to said duct, the arms and the spacers can advantageously be articulated to the fairing about common axes of articulation in order thus to define a triangular system radiating from the axis of the nozzle. In this manner, through the medium of a combination of means which are not obvious, a strong mechanical suspension is created which enables stresses, and in particular synchronizing stresses, to develop freely, whilst ensuring that the fixed-geometry duct remains strictly coaxial and the transverse supporting body and fairing likewise.

In accordance with another feature of the invention, auxiliary flaps articulated at one of their ends to the fixed-geometry duct, are supported at their other ends on the controlled flaps in order to ensure that whatever the position of the latter the duct or nozzle is continuous and gastight.

The ensuing description which relates to the accompanying drawing will indicate by way of a nonlimitative example how the invention may be carried into practice.

In the drawing:

FIGS. 3, 4 and 5 are sectional views, respectively on the lines III—III, IV—IV and V—V, of a sector of the flame tube assembly, including the nozzle, shown in FIG. 1;

Figure 1:
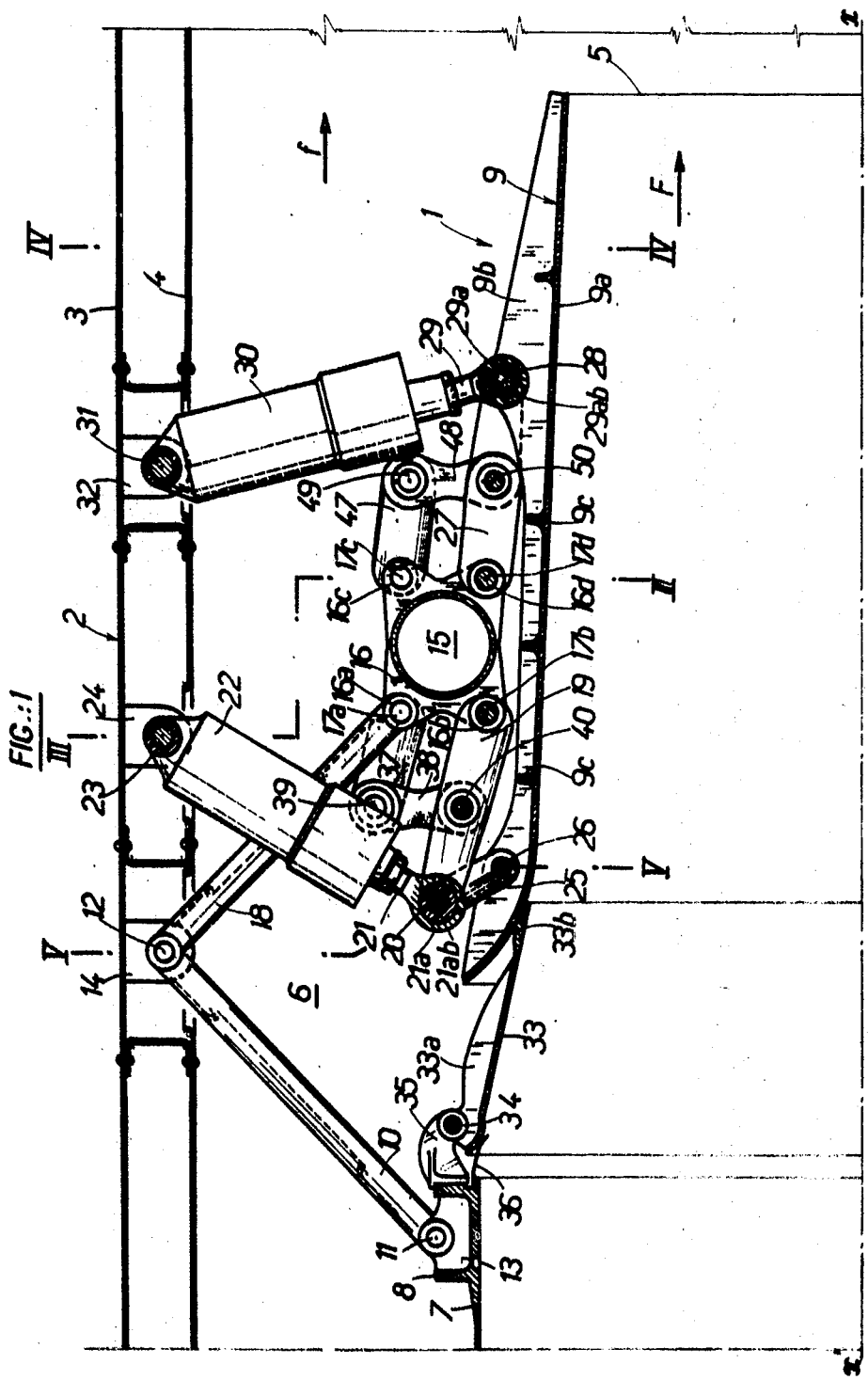
FIG. 1 is a schematic half-section in an axial plane, through a preferred embodiment of an assembly for regulating the flow of a fluid, in the present instance a variable nozzle or variable ejection system through which flows the propulsive jet of a gas turbine jet engine, said assembly comprising a variable-geometry duct or nozzle located within a fairing.
Figure 2:
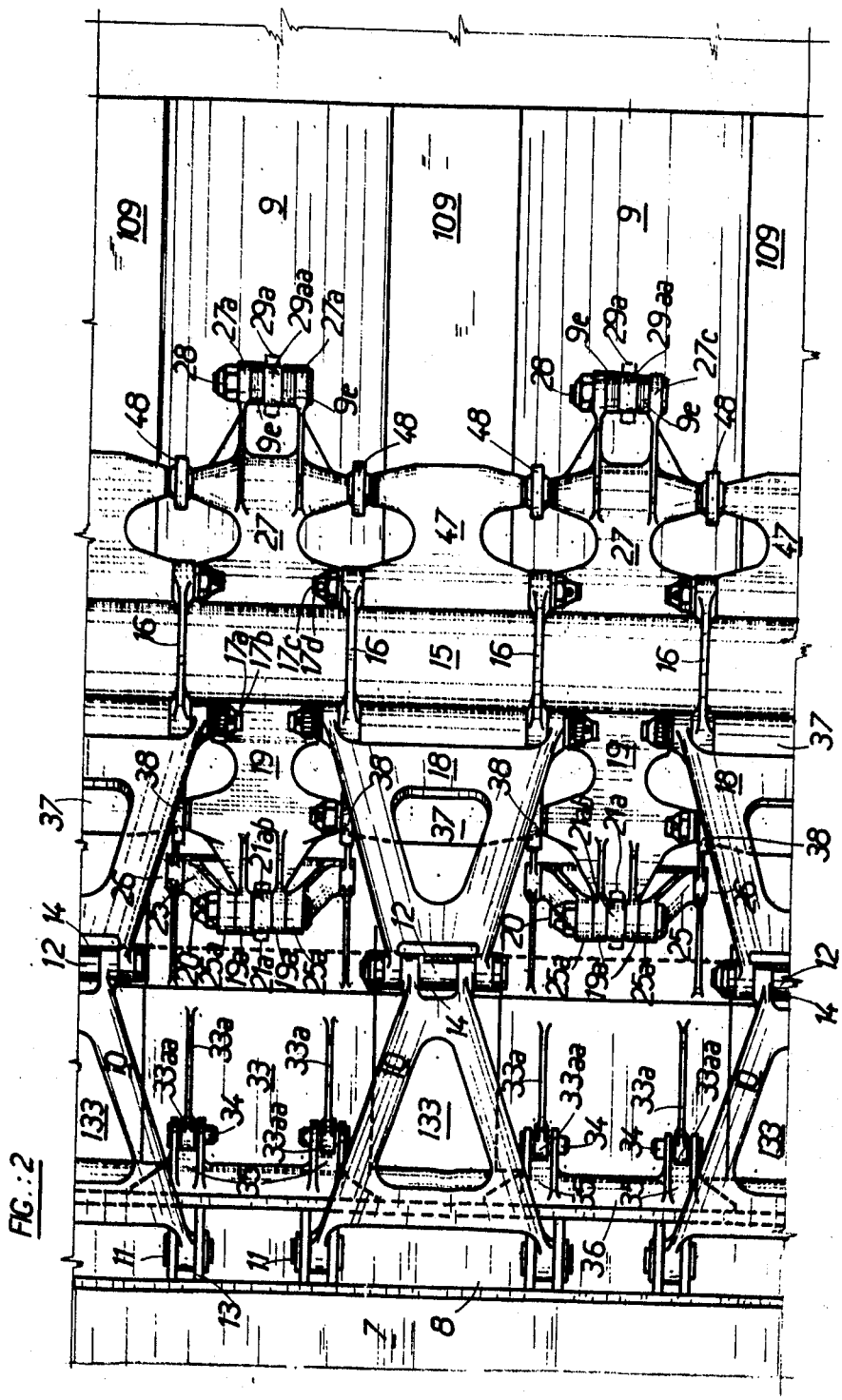
FIG. 2 is a partial external view of the variable-geometry nozzle shown in FIG. 1, the fairing having been removed.
Figure 3:
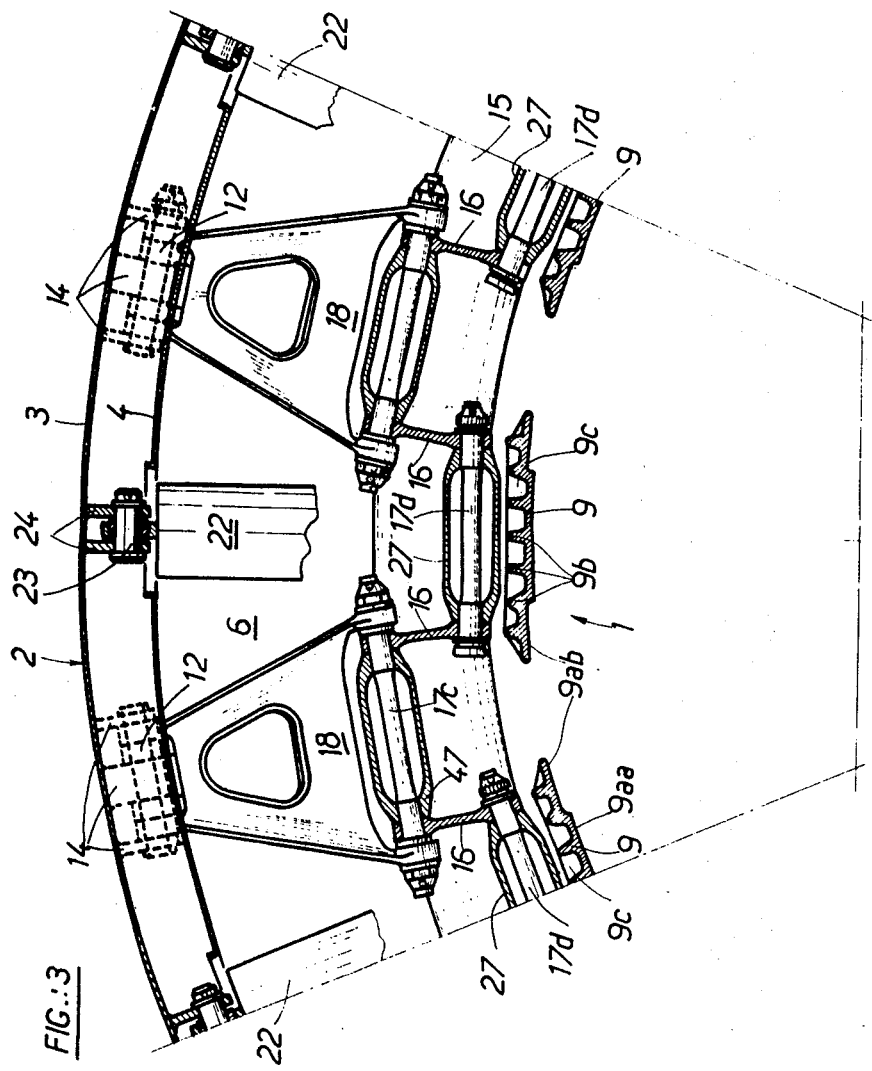

In the drawing, an assembly for controlling the flow of fluid has been shown, which assembly is constituted in the example selected by a variable-ejection system for a propulsive gas jet which is discharged towards the rear from a gas turbine jet engine the forward part of which has not been illustrated.

This ejection or flame tube system comprises a duct or primary nozzle 1, with an axis $x'-x$, through which a primary gas flow F passes, said duct or nozzle being disposed coaxially inside a fairing 2 having a larger cross section than that of the nozzle. The fairing, which has walls 3, 4, extends downstream beyond the exit section 5 of the primary nozzle, and may be terminated at its downstream end in control flaps (not shown). The fairing and the nozzle between them delimit an annular space 6 which may serve as a passage for a secondary airflow $f$ which is partially mixed with the primary jet after exit from the nozzle 1, the combination of the two flows constituting the propulsive jet of the jet engine.

The nozzle 1 comprises a fixed-geometry duct 7 terminating in an end flange 8, and a peripheral series of main flaps, alternately controlled flaps 9 and follower flaps 109, numbering 32 in the selected example, the lateral edges of which flaps overlap one another in order to ensure a gastight seal whatever the size of the nozzle opening. Thus, in this example, there are 16 controlled flaps and 16 follower flaps.

Each of the flaps, for example the controlled ones, comprises a skin 9a which, on its external face, carries longitudinal and transverse stiffener ribs 9b and 9c respectively. The internal face of the skin 9a of each of the controlled flaps has a central part 9aa and two lateral edges 9ab which are set back in relation to the central part, in order to delimit support zones for the lateral external edges 109ab of the neighboring follower flaps 109 (see FIG. 5). In a conventional manner, the follower flaps are applied by the pressure of the primary jet F against the lateral edges 9ab of the controlled flaps, stops possibly being provided (but not being shown), in order to limit their longitudinal and tangential deployment if necessary. Each of the flaps 9–109, viewed in section along an axial plane, exhibits a curved profile so that in certain flap positions the nozzle possesses a convergent-divergent configuration.

The fixed-geometry duct 7 is centered at the rear in the fairing 2 through the medium of spacers 10 of generally triangular shape, which are perforated in order to pass secondary air.

These spacers, which are peripherally distributed in the annular space 6, there being 16 of them in the example chosen, are each articulated at their respective ends about pivots 11, 12 carried by lugs 13, 14, respectively fixed to the flange 8 of the duct 7 and to the walls of the fairing 2.

A transverse supporting body, constituted in the present instance by a hollow ring 15 of toroidal form, extends substantially coaxially with the nozzle 1 through the annular space 6 defined between the flaps 9–109 and the fairing 2. To this ring there are attached, for example by welding, flanges 16 of generally rectangular form, numbering 32 in the example chosen, and distributed uniformly around the periphery of the ring, each being contained in a plane or, more generally, a surface, parallel to the axis X'–X of the nozzle. At the four corners of each of the flanges 16 holes 16a, 16b, 16c, 16d are drilled, in which holes there are respectively located substantially tangential hinge pins 17a, 17b, 17c, 17d. Triangular arms 18, lightened by perforations, numbering 16 and distributed peripherally in the present example, are each articulated on the one hand to two consecutive flanges 16 about a pivot pin 17a, and on the other hand to the fairing about a pivot pin 12. Each pivot pin 12 is thus common to a spacer 10 and an arm 18, thus creating a triangular linkage system radiating about the axis X'–X of the nozzle. In this way, both in respect of the fixed duct 7 and the supporting ring 15, a strong mechanical suspension arrangement is created which allows stresses of thermal, aerodynamic or mechanical origin to develop freely whilst ensuring that the said duct, said ring and said fairing 2 are maintained strictly coaxial.

Each of the controlled flaps is suspended from the supporting ring 15 through the medium of two independent linkages, which also control the flaps.

The first of these linkages comprises, in respect of each of the flaps, a control lever 19 extending peripherally within the space defined between two consecutive arms 18. At one of its ends, the lever 19 is articulated about a pivot pin 17b to two consecutive flanges 16 integral with the ring 15. At its other end, this lever has two bearings 19a–19a to which it is articulated about a pivot pin 20 and, through the medium of a knuckle joint 21ab, to the eye 21a of a first individual control element, in the present instance the rod 21 of a jack 22 whose fixed part is articulated about a pivot pin 23 carried by a lug 24 integral with the fairing 2. Around the pin 20 there is also articulated, through the medium of two bearings 25a–25a, one of the ends of a transmission link 25 whose other end is articulated to a first zone, for example the upstream zone, of the relevant controlled flap 9, this articulation being effected in practice about a first pivot pin 26 disposed substantially tangentially in two bearings 9d–9d integral with the said flap (see FIG. 5).

The second of these linkages comprises, in respect of each of the controlled flaps 9, a control lever 27 extending within the same peripheral interval as the control lever 19. At one of its ends, the lever 27 is articulated, about a pivot pin 17d, to two consecutive flanges 16 integral with the ring 15. At its other end, it exhibits two bearings 27a–27a through which it is directly articulated to a second zone, for example the downstream zone, of the controlled flap 9 in question, about a second pivot pin 28 assembled substantially tangentially in two bearings 9e–9e integral with said flap (see FIG. 4). To each of the pivot pins 28 there is thus articulated, through the medium of a knuckle joint 29aa, the eye 29a of a second individual control element, in the present instance the rod 29 of a jack 30 whose fixed part is articulated about a pivot pin 31 carried by a lug 32 integral with the fairing 2.

Thus, the 16 controlled flaps 9 can be operated by a first series of 16 upstream jacks 22 and a second series of 16 downstream jacks 30, respectively about the upstream pivot pins 26 and the downstream pins 28 of the said flaps.

The position of the controlled flaps 9, determined by the position of their pins 26 and 28, varies not only in the transverse but also in the longitudinal direction. In order to ensure that, whatever the position of these flaps, the nozzle 1 is continuous and gastight, auxiliary flaps 33 close off the space defined between the fixed duct 7 and the flaps 9. These auxiliary flaps each carry two ribs 33a–33a, in each of which there is formed a bearing 33aa adapted to carry a pivot pin 34 assembled in a lug 35 integral with the fixed duct 7. The auxiliary flaps 33 are thus articulated to the duct each at one of their ends. At the other end, these flaps each have a bead 33b which, under the effect of the primary gas flow F, is applied against the internal face of the skin 9a of a main controlled flap 9, the actual contact between the two elements taking place at a point which varies depending upon the position of the flap 9. Auxiliary flaps 133 are mounted, in floating manner, to act as follower flaps, between the consecutive articulated auxiliary flaps 33. A flat spring 36, made of preformed strip, has a supplementary sealing function between the auxiliary flaps 33–133 and the fixed duct 7.

At least one, and preferably each one, of the two control linkages of a flap 9, will form part of a closed synchronizing system by means of which it is possible, in particular to equalize the extended lengths of the rods of the control jacks so that they adopt a common mean position.

This arrangement, considered in relation to the upstream (or downstream control) of the flaps 9 comprises, in particular, a series of intermediate levers 37 (or 47 as the case may be), located respectively in line with the follower flaps 109, that is to say between the peripherally consecutive control levers 19 (or 27), belonging to said control, but at a larger mean radius. At one of its ends, each of the intermediate levers 37 (or 47), is articulated about a pivot pin 17a (or 17c), to two consecutive flanges 16 integral with the ring 15. At its other end, it is connected to the two surrounding control levers 19 (or 27), through the medium of two synchronizing links 38 (or 48). Each of these links is articulated, at one of its ends, to one of the ends of a pivot pin 39 (or 49), substantially tangentially disposed and carried by an intermediate lever 37 (or 47), and, at its other end, to one of the ends of an intermediate pivot pin 40 (or 50), disposed substantially tangentially and carried by a control lever 19 (or 27).

It will be observed that the intermediate levers 37 are articulated about the same pivot pins 17a as the arms 18; they are thus radially in line with these latter but at a smaller mean radius. It will be seen, too, that because of their peripheral offset, the substantially tangential pivot pins 39 and 40 (or 49 and 50) are not exactly parallel. It is thus necessary to arrange, at the two ends of each pivot pin, knuckle joints which enable the links 38 (or 48) to articulate despite the relative obliquity of said links and said pivot pins.

The links in the chain of the synchronizing arrangement thus created are accordingly constituted by a control lever 19 (or 27), a synchronizing link 38 (or 48), an intermediate lever 37 (or 47), another synchronizing link 38 (or 48), another control lever 19 (or 27), and so on.

The geometric figure determined, on the one hand, by the respective points of articulation of one and the same link 38 to the pivot pins 39, 40, and on the other hand, by the loci in an axial plane substantially containing said link when the nozzle is in the mean opening position, of the respective pivot pins 17a, 17b of an intermediate lever 37 and of a control lever 19, is a quadrilateral 39–17a–17b–40 (with which there corresponds a similar quadrilateral 17c–49–50–17d for the other flap control). In the event of any variations in the geometry of the duct or nozzle 1, this quadrilateral distorts whilst retaining a fixed side 17a–17b (or 17c–17d) substantially contained in the transverse body or supporting ring 5–16.

This quadrilateral is preferably designed in order, for a mean opening of the nozzle, to constitute a parallelogram and thus reduce the magnitude of the stresses which develop in the synchronizing system. To this end, the various elements of this system are dimensioned so that for the said mean opening condition, the synchronizing links 38 (or 48) are, by construction, precisely located in axial planes and are parallel to the sides 17a–17bq(or 17c–17d) of the quadrilateral.

To either side of this mean position, and taking into account the fact that the pivot pins 39 (or 49) and 40 (or 50) have fixed tangential length, the links 38 (or 48) project out of these planes so that the parallelogram is no longer flat but slightly twisted, the direction of twist changing with any deviation from the mean position, where the twist is zero. This slight twist, however, has no effect upon the quality of the synchronization obtained.

Finally, the arrangement of attachment and control of the controlled flaps 9 is constituted by a supporting ring 15 articulated to the fairing 2, on which there are assembled in a substantially symmetrical fashion relative to the center plane of the ring, two extensible deformable rings of levers and links, each integrated within a chain or system of synchronization. These rings define, for each pair of variable positions of the pivot pins 26 and 28, a cone of revolution about the axis of the nozzle, this determining the position of the flaps 9.

Figure 6:
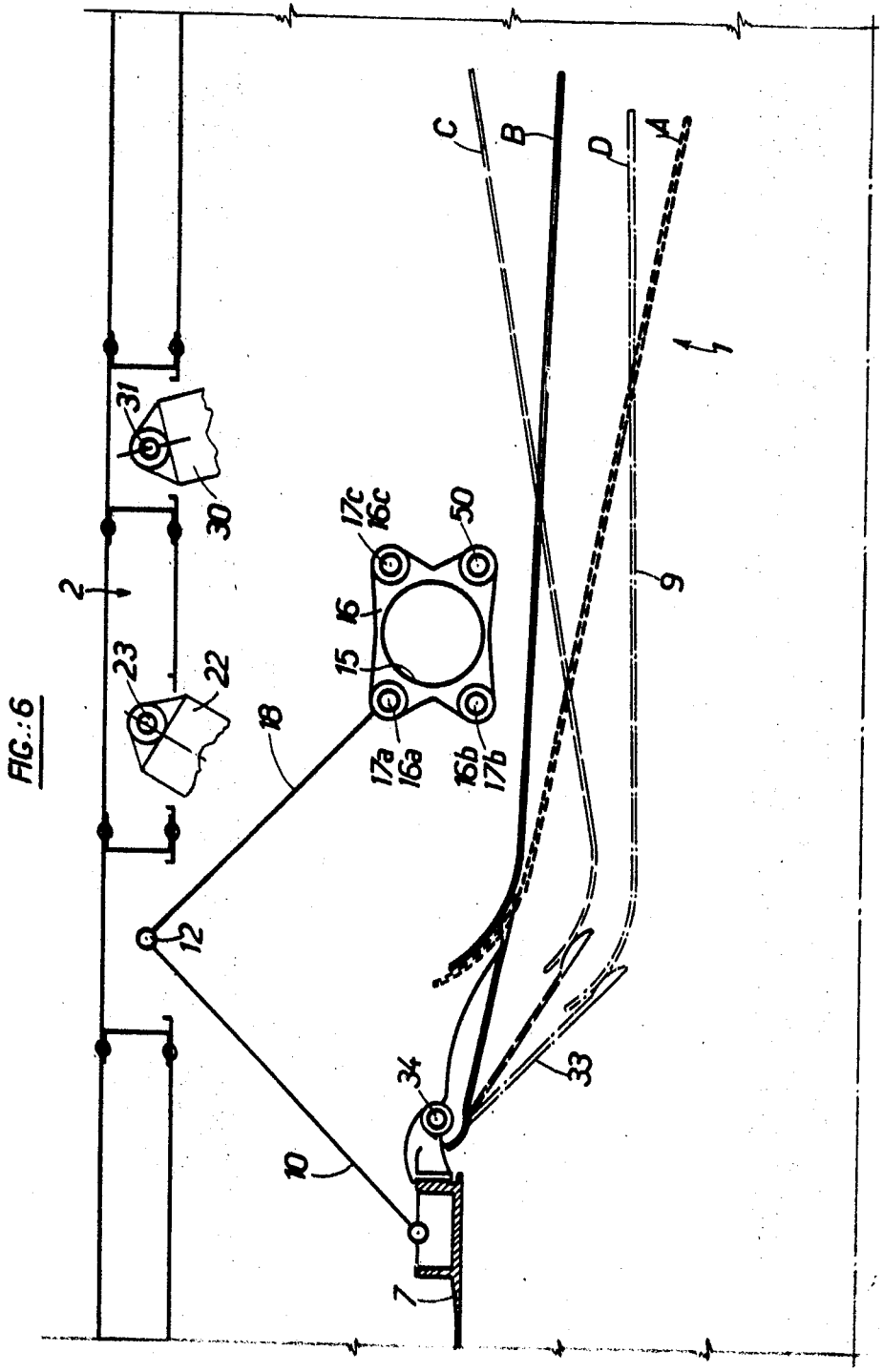
FIG. 6 is a simplified view illustrating some of the configurations which the variable-geometry nozzle forming part of the flame tube assembly can adopt.

In FIG. 6, a highly schematic illustration of some of the configurations such as A, B, C, D, which the variable-geometry nozzle forming part of the ejection or flame tube system in accordance with the invention, can adopt.

As those skilled in the art will appreciate, a high-performance supersonic flame tube or nozzle system should also be capable of operating correctly under all intermediate conditions of flight, that is to say within a wide range of speeds and altitudes. Those skilled in the art will also appreciate that in order for the efficiency of the flame tube or ejection system to remain acceptable, it is necessary for the static pressure at the nozzle exit to remain as close as possible to the ambient static pressure outside the nozzle, this whatever the value of the nozzle expansion ratio. Finally, those skilled in the art will appreciate that the volume of air and gas passing through the power plant varies very substantially under different conditions of load and altitude.

The flame tube or ejection system in accordance with the invention completely satisfies these various requirements and is capable of adapting itself constantly, with optimum efficiency, to the various thermodynamic and aerodynamic conditions which may arise. At subsonic speeds, the nozzle will be convergent (see FIG. 6, configurations A and B), it being exclusively the exit section, which is also the throat section, which is regulated. At supersonic speeds, the nozzle will be convergent-divergent (see FIG. 6, configurations C and D), the throat section and the exit section being adjustable independently of one another.

Because of the method of suspension and control selected for the flaps, the duct or nozzle equipped with these flaps can respond successively or simultaneously to two separate control effects. Each of these control effects is produced by a synchronizing device whose function is to make the nozzle retain at all times cross-sectional forms which are circular and concentric with one another, this despite possible dissimilarities in the strokes of the jacks, friction effects, and variations in gas pressure. Possible asymmetries in the control of the flaps are absorbed in the form of mechanical stresses by the transverse supporting body or ring 15, and transmitted by this latter in a symmetrical manner to the fairing 2 through the articulated arms 18. Finally, whatever the stresses, be they of thermal, aerodynamic or mechanical origin, to which the various parts are subjected, the fixed duct 7, the supporting ring 15 and the fairing 2 always remain coaxial with one another so that no inadvertent or undesired modification in the orientation or intensity of the thrust vector can develop.

It will be appreciated that the embodiment described is merely an example and that it is open to modification in various ways without departing from the scope of the invention, which is defined in the appended claims.

1. In a gas jet ejection system including a fairing and a variable-geometry duct assembled within said fairing, said duct comprising a plurality of adjustable flaps forming a peripheral series and at least some of which are to be controlled; an arrangement for controlling and supporting the duct comprising:
a transverse supporting body;
means mounting said body in the space between the duct and the fairing, said mounting means comprising a plurality of arms forming a peripheral series and articulated at their respective ends to the fairing and to the said body;
two independent linkages for each of the flaps to be controlled, whereby the said flaps are suspended from the supporting body, the said two linkages for each flap being articulated to the body and to the flap respectively at axially spaced zones of the latter, each linkage including a control lever articulated at one end to the supporting body;
and a control element for each zone of each flap to be controlled, to which control element is articulated the other end of the corresponding control lever.

2. An arrangement as claimed in claim 1, wherein each of the two control elements of a flap is constituted by a moving part of a jack whose fixed part is articulated to the fairing.

3. An arrangement as claimed in claim 1, wherein each of the flaps, viewed in section in an axial plane, exhibits a curved profile so that the duct, in certain flap positions, has a convergent-divergent configuration.

4. An arrangement according to claim 1, including, for each flap to be controlled, a transmission link to one end of which is articulated that end of the control lever which is also articulated to the control element, the other end of the transmission link being articulated to one of the zones of the flap.

5. An arrangement according to claim 4, wherein, at each flap to be controlled, at that of its ends which is already articulated to the other control element of the flap, the control lever belonging to the other linkage is articulated directly to the other zone of the flap.

6. An arrangement according to claim 1, including a chain of synchronization with which is integrated at least one of the two linkages of each flap to be controlled, said chain incorporating the control levers of the appropriate linkages and comprising a series of intermediate levers each connected through the medium of two synchronizing links to the two control levers which embrace it, each of said intermediate levers being itself articulated to the transverse supporting body.

7. An arrangement according to claim 6, wherein the control levers and the intermediate levers are each articulated to the transverse supporting body about substantially tangentially disposed pivot pins; and wherein the geometric figure defined on the one hand by the respective points of articulation of one and the same synchronizing link to a control lever and to an intermediate lever, and on the other hand by the loci of said tangential pivot pins on an axial plane substantially containing said links, when the duct is in a mean opening position, is substantially a parallelogram which can distort during variations in the geometry of the duct whilst retaining one fixed side, which fixed side is constituted by a segment of a straight line substantially contained in said supporting body and linking said loci with one another.

8. An arrangement according to claim 1, in a gas jet ejection system also including a fixed-geometry duct of which the variable-geometry duct is located in continuation, the said arrangement also including means for centering the fixed-geometry duct in the fairing and comprising a peripheral series of spacers articulated at their two ends respectively to the said fairing and to the said duct, the supporting arms of the transverse body and said spacers being articulated to the fairing about common pivot pins.

9. An arrangement according to claim 1, further comprising auxiliary flaps articulated at one of their ends to the fixed duct and bearing through their other ends on the controlled flaps, whereby it is ensured that whatever the position of the latter the duct is continuous and gastight.